TUNNEL DIODE MAJORITY LOGICAL ELEMENT

Filed June 1, 1960 2 Sheets-Sheet 1

Inventor:
Jerome J. Tiemann,
by John F. Ahern
His Attorney.

Boolean

| a | b | c |
|---|---|---|
| 0 | 0 | 0 |
| 1 | 0 | 0 |
| 0 | 1 | 0 |
| 1 | 1 | 1 |

Majority Decision

| a | b | c |
|---|---|---|
| -1 | -1 | -1 |
| +1 | -1 | -1 |
| -1 | +1 | -1 |
| +1 | +1 | +1 |

Boolean

| a | b | c |
|---|---|---|
| 0 | 0 | 0 |
| 1 | 0 | 1 |
| 0 | 1 | 1 |
| 1 | 1 | 1 |

Majority Decision

| a | b | c |
|---|---|---|
| -1 | -1 | -1 |
| +1 | -1 | +1 |
| -1 | +1 | +1 |
| +1 | +1 | +1 |

Boolean

| a | c |
|---|---|
| 1 | 0 |
| 0 | 1 |

Majority Decision

| a | c |
|---|---|
| +1 | -1 |
| -1 | +1 |

Inventor:
Jerome J. Tiemann,
by John F. Ahern
His Attorney.

United States Patent Office 3,097,311

Patented July 9, 1963

3,097,311

TUNNEL DIODE MAJORITY LOGICAL ELEMENT

Jerome J. Tiemann, Burnt Hills, N.Y., assignor to General Electric Company, a corporation of New York Filed June 1, 1960, Ser. No. 33,317

10 Claims. (Cl. 307—88.5)

Figure 1:
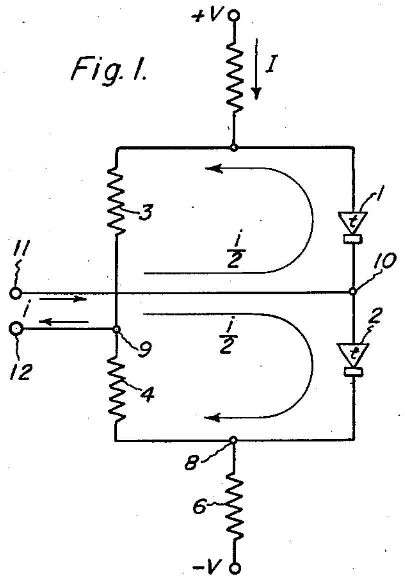

This invention relates in general to switching circuits and in particular to a new and improved logical element utilizing semiconductor devices, and to networks embodying such an element.

In computer and data processing systems, a system of symbolic logic is employed and logical elements are utilized to represent operators in this system. The logical elements referred to herein are the smallest building blocks which can be represented by operators in the logic system employed. For example, the term "logical element" connotes a circuit, including one or more active electronic devices and associated circuit components, which is capable of performing logical functions. Typical examples of such logical elements are the AND gate, the OR gate and the FLIP-FLOP. It is known that a digital system of any desired complexity can be made by the appropriate combination of the four basic logic functions, DELAY, AND, OR and NOT.

With the requirement for computer and data processing systems of higher and higher operating speeds it has been recognized that, due to the inherent limitations in the operating times of such devices as vacuum tubes and transistors, a new computing or logical element must be utilized.

One approach to this problem is given in an article by R. L. Wigington entitled "A New Concept in Computing," found in the Proceedings of the I.R.E., vol. 47, No. 4, April 1959, pages 516–523. There is described therein the concept of using the phase of a sine wave signal as an information-bearing medium, which, together with a system of majority decision logic, permits the realization of logic operations. A discussion of a similar computing element and scheme of majority logic is to be found in an article by Eiichi Goto entitled "The Parametron, a Digital Computing Element which Utilizes Parametric Oscillations," Proceedings of the I.R.E., vol. 47, No. 8, page 1304 (1959).

By means of such logical elements and majority logic, a complete digital system can be constructed using only this single kind of logical element. For example, majority logic provides a system wherein there is a plurality of input signals to the logical element for a single output. Since it is a majority system there must be an odd number of inputs to avoid the indeterminate case. By appropriate selection of these inputs, the logical element can be made to provide the selected function, such as for example, AND, OR and NOT. The majority logic system, therefore, provides great flexibility and circuit simplicity.

The logical elements described in the above articles are presently even slower than those utilizing such active circuit components as vacuum tubes and transistors and further are feasible only for the very large scale systems because of their size, cost and the requirement of providing a high frequency power supply. There is a continuing need, therefore, for a new high speed logical element for computing and data processing systems.

With the advent of the "tunnel diode" there is available an extremely high speed, stable, active circuit component. The "tunnel diode" is a two terminal active circuit component exhibiting a unique current-voltage characteristic having a negative resistance region in the forward voltage range thereof. This new component has been so called because of its use of the quantum mechanical tunnel principle.

Because of its unique current-voltage characteristic the "tunnel diode" may be utilized as a bi-stable component. One stable state may be a low voltage condition and the other stable state a higher voltage condition. This implies that the output power available when the "tunnel diode" switches can be greater than that needed to initiate such switching.

"Tunnel diodes" have high operative speeds, low power requirements and wide operating temperature ranges. Presently the most readily available "tunnel diodes" are semiconductive devices fabricated from the well known semiconductive materials such as germanium and silicon and from intermetallic compounds such as gallium arsenide.

The properties of this component indicate its possible use in computer and data processing circuitry. This new circuit component, however, is a non-phase inverting and completely bilateral device and, therefore, presents inherent disadvantages when utilized for computer and data processing applications. For example, because it is a non-phase inverting device the NOT operation can not be performed in a manner such as employed with such known phase inverting circuit components as transistors and vacuum tubes. In addition, in computer and data processing systems, information must be made to flow unidirectionally, in a direction from input to output. In this respect, the bilateral characteristic of the tunnel diode presents a serious problem of feed-back when considered in such systems.

I have found, however, that utilizing appropriate cooperating circuitry the "tunnel diode" can be utilized with a system of majority decision logic to provide a new and improved logical element capable of performing all the required functions for a computing system of any desired complexity.

It is an object of this invention, therefore, to provide a new and improved logical element which avoids one ore more of the disadvantages of the prior art and is capable of still higher operating speeds.

It is another object of this invention to provide a new and improved logical element utilizing "tunnel diodes" as the active circuit components therein and which overcomes the inherent problems associated therewith.

It is still another object of this invention to provide a new and improved logical element utilizing a system of majority logic to perform all the required functions of a system of symbolic logic.

It is another object of this invention to provide a logical network of any desired complexity by an appropriate interconnection of a plurality of similar logical elements.

It is yet another object of this invention to provide a new and improved logical element capable of providing sequential operation between interconnected logical elements in a system initiated from a single voltage pulse.

Briefly stated, in accordance with one aspect of this invention, I provide a logical element comprising a pair of tunnel diodes connected in parallel circuit relationship with a resistance. The parallel circuit so formed is connected to a voltage source through an appropriate impedance such that one diode is in a high voltage condition and the other diode is in a low voltage condition. Means are provided to apply an odd number of input signals between the common juncture of the diodes and a point on the resistance branch of the parallel circuit providing a "prejudice" current of a polarity determined by the majority of the inputs. The polarity of this "prejudice" current determines which diode achieves the high voltage condition which in turn determines the polarity of the output voltage. The polarity of the output voltage, therefore, is a binary quantity which may be utilized to perform the required logical functions.

Figure 2:
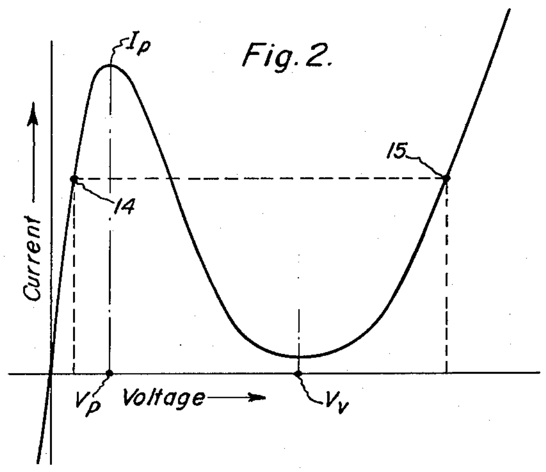
Figure 3:
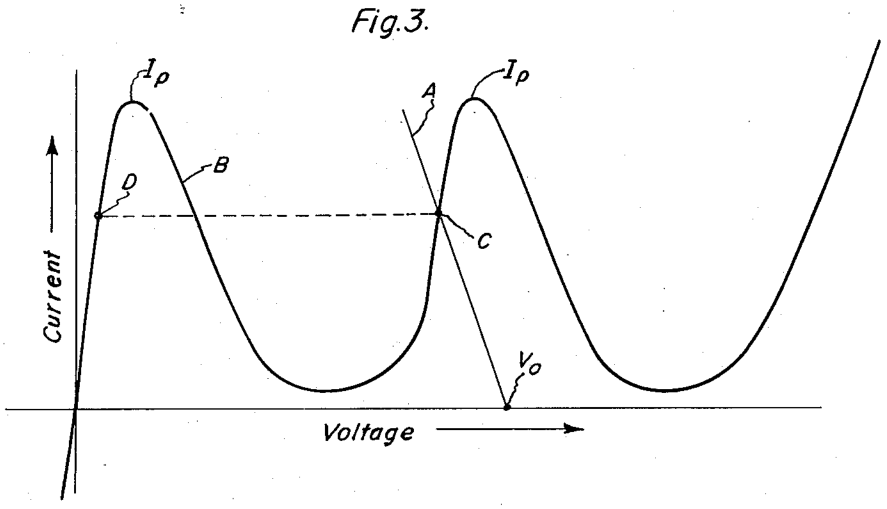
Figure 4:
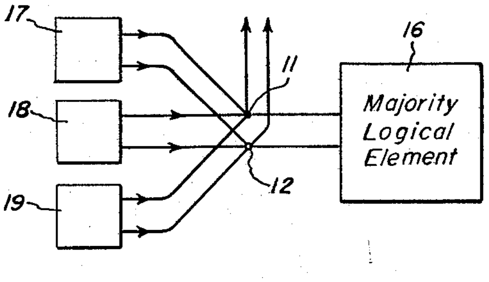
Figure 5:
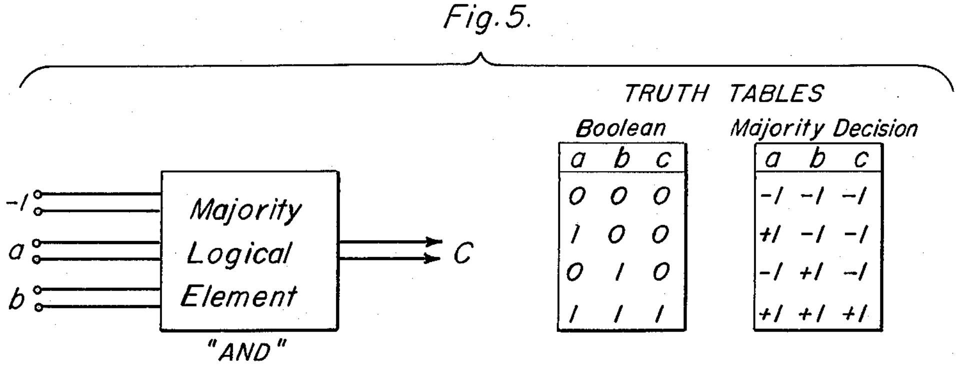
Figure 6:
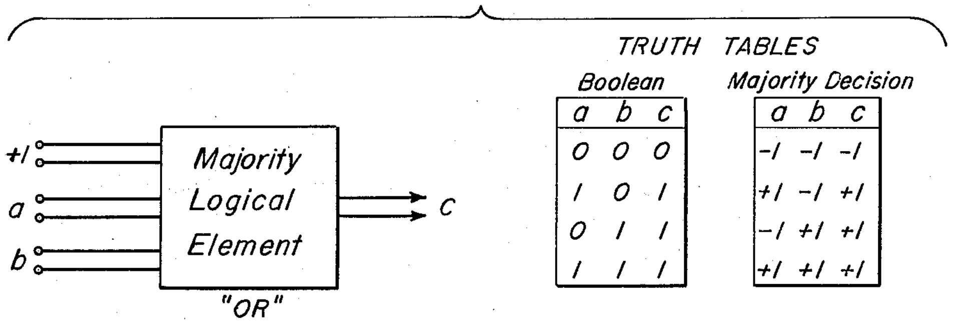
Figure 7:
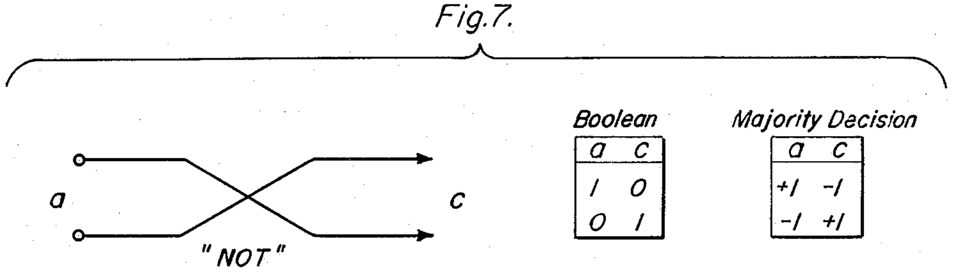
Figure 8:
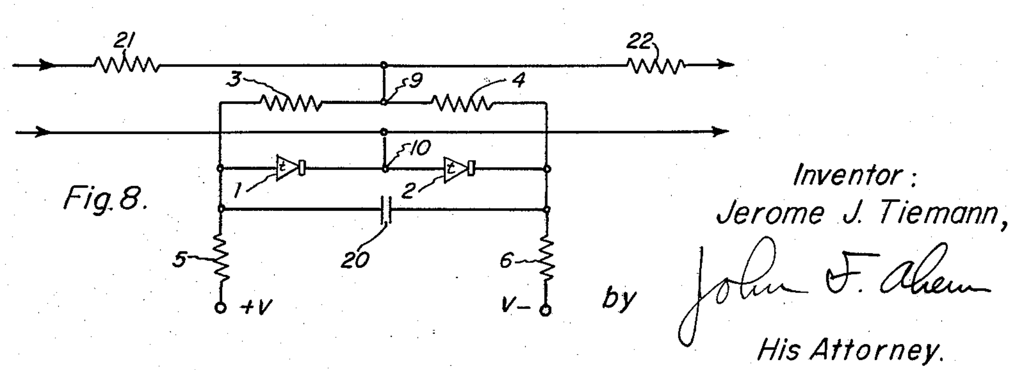

The features of my invention which I believe to be novel are set forth with particularity in the appended claims. My invention itself, however, both as to its organization and method of operation, together with further objects and advantages thereof, may best be understood by reference to the following description taken in connection with the accompanying drawings wherein like components have been designated by the same reference numerals throughout the figures and in which:

FIG. 1 is a schematic circuit diagram of the basic embodiment of this invention, FIG. 2 is a typical current-voltage characteristic of the semiconductor devices utilized in the practice of this invention, FIG. 3 is a current-voltage characteristic of the series connected semiconductor diodes utilized in the practice of this invention, FIG. 4 is a modified block diagram showing the logical element of this invention interconnected to a plurality of signal sources for performing majority decision logic, FIGS. 5 to 7 are diagrammatic illustrations of the logical element of this invention for providing the elementary logic functions AND, OR and NOT respectively, with appropriate majority decision and Boolean truth tables therefor; and, FIG. 8 is a schematic circuit diagram of another embodiment of this invention which provides sequential operation between interconnected logical elements in a system initiated from a single pulse.

Although any negative resistance element may be used as a threshold sensing device and, therefore, may be utilized for static switching operations the device utilized in the preferred embodiment of this invention is a narrow junction degenerate semiconductor diode or so-called "tunnel diode." Such diodes are semiconductor devices including a single P-N junction and exhibiting a region of negative resistance in the low forward voltage range of their current voltage characteristics.

Such devices are fabricated so as to provide regions of P and N-type conductivity having a very narrow junction therebetween, both of the regions being degenerate. The use of the term "degenerate" refers to a body or region of semiconductive material which, if N-type, contains a sufficient concentration of excess donor impurity to raise the Fermi-level thereof to a value of energy higher than the minimum energy of the conduction band on the energy band diagram of the semiconductive material. In a P-type semiconductive body or region, degeneracy means that a sufficient concentration of excess acceptor impurities are present therein to depress the Fermi-level to an energy lower than the maximum energy of the valence band on the energy band diagram for the semiconductive material. The Fermi-level in such an energy band diagram is the energy level at which the probability of there being an electron present in a particular state is equal to one-half.

The forward voltage range of the current voltage characteristic of such a device at which the negative resistance region appears varies depending upon the semiconductive material from which the device is fabricated. For example, the range of the negative resistance region for a germanium device is from about 0.04 to 0.3 volt while for gallium arsenide the range is from about 0.12 to 0.5 volt.

For further details concerning the narrow junction degenerate semiconductor diode described above, reference may be had to my copending application Serial Number 858,995, filed December 11, 1959, which is assigned to the assignee of the present invention and incorporated herein by reference.

In FIG. 1 there is shown a pair of narrow junction degenerate semiconductor diodes 1 and 2 connected in series circuit to provide current flow in the same direction. A pair of series connected resistances 3 and 4 of equal value are connected across the series connected diodes forming a parallel combination having two branches. These branches are referred to hereinafter as the "resistance branch" and the "diode branch." This parallel combination of resistances and diodes is connected through current limiting resistances 5 and 6 to a voltage source V. Diodes 1 and 2 and resistances 3 and 4 thus form the respective ratio arms of a bridge network having a first pair of junctions 7 and 8 between the resistances and the diodes and a second pair of junctions 9 and 10 between the pairs of diodes and resistances. Voltage source V is connected through resistances 5 and 6 respectively to the first pair of junctions 7 and 8. The voltage source V and resistances 5 and 6 are selected to provide an open circuit voltage $V_o$ across the parallel combination which has a magnitude sufficient to allow one, but only one, of the diodes to operate in the high voltage condition at any one time.

To better understand the operation of diodes 1 and 2 in different voltage operating conditions reference may be had to FIG. 2. In FIG. 2 there is shown a typical current-voltage characteristic of the narrow junction degenerate semiconductor diodes used in the practice of this invention. There is a region of negative resistance in the low forward voltage range between the voltage $V_p$, corresponding to the diode peak current $I_p$, and the voltage $V_v$ corresponding to the diode valley current. Because of the nature of a "negative resistance" there can be no stable operation in this region. As used herein when the current and voltage of the diode have values establishing an operating point in the positive resistance region between zero voltage and the voltage $V_p$, this operating condition is denominated the "low voltage condition." When the current and voltage of the diode have values establishing an operating point in the positive resistance region beyond the voltage $V_v$, this operating condition is denominated the "high voltage condition." From FIG. 2 it is readily apparent that if either the current or voltage of the diode exceed a value corresponding to the diode peak current $I_p$ the diode abruptly shifts from a low voltage condition to a high voltage condition.

The potential at the point 9 is equal to the voltage $V_o$ less the voltage across resistance 3. This potential is constant for any given value of $V_o$. The potential at the point 10 is equal to the voltage $V_o$ less the voltage across diode 1. Since the voltage across diode 1 depends upon whether that diode is in its high or low voltage operating condition, the potential at point 10 is not constant but depends on the respective operating conditions of diodes 1 and 2. The polarity of the voltage between points 9 and 10, therefore, is determined by the respective operating conditions of the diodes. For example, when diode 1 is in the high voltage condition the potential of point 9 with respect to point 10 is negative, while when diode 2 is in the high voltage condition the potential of point 9 with respect to point 10 is positive. The voltage appearing at the terminals 11—12 as the output is referred to as a positive voltage when the latter condition prevails and as a negative voltage when thte former prevails. The polarity of this output voltage is a binary quantity which may be utilized to denote a logical function. The above components are all that are required in this new and improved logical element.

The circuit just described may be used with an information controlling means and a scheme of majority decision logic to perform all the logical functions necessary to construct a system of any desired complexity.

In a logical machine, there must be a way of controlling the flow of information. For example, information must flow unidirectionally from input to output, the first stage controlling the second, but the second not controlling the first or interfering with its operation. Normally, the active circuit components utilized in the logical elements of the system, to provide the appropriate gain and gating functions, are unilateral devices such as vacuum tubes or transistors. With such unilateral devices there is an automatic control over the flow of information. The logical element described above, however, comprises circuit components which are all bilateral. That is, a signal may be translated equally well through these components in either direction. In a system utilizing such bilateral logical elements, therefore, there must be a separate control established to assure the flow of information in only one direction.

The control of the information flow in a system utilizing bilateral logical elements may be conveniently provided by means of a three-phase power supply. The use of such a three-phase power supply to provide sequential operation between interconnected circuits is well-known in the art. The pulses developed by the three-phase supply are usually limited to an overlap of approximately one-third of their length. A mode of operation may thus be provided for the system whereby, after the logical information has entered a given stage, the stage feeding it is de-energized. The logical information thus travels in the form of a wave with an inactive stage between each transferring stage in well-known manner.

The operation of the circuit of FIG. 1 may best be understood by reference to the current-voltage characteristic of the series connected tunnel diodes 1 and 2 shown in FIG. 3.

In the absence of an input signal at the terminals 11—12, when the power supply is energized, applying the voltage V to the logical element, a current I flows in the direction shown and divides between the two branches of the parallel circuit. Because of the nature of the negative resistance of the tunnel diodes used in the practice of this invention, a value of current in the diode branch which would exceed that corresponding to the diode peak current $I_p$, causes that diode to abruptly shift to a higher voltage operating condition.

The voltage $V_o$ across the parallel combination of resistances and diodes and hence the voltage across the series connected diodes 1 and 2 is selected to provide that when one diode is in its high voltage condition the available voltage for the other diode is not sufficient to allow for operation other than in its low voltage condition. This assures that one, and only one, diode may operate in its high voltage condition at any one time. In FIG. 3 the intersection of the direct current load line A with the current-voltage characteristics B of the series connected tunnel diodes at the point C determines the operating point for the circuit as a whole. For example, in the absence of an input signal at the terminals 11—12, the current in diodes 1 and 2 is necessarily the same since they are connected in series. The voltage across each of the diodes, however, is different. Thus, the operating point C in FIG. 3 represents the voltage across the diode which is in the high voltage condition. The other diode must operate in its low voltage condition and has a voltage across it corresponding to the point D. If the diodes utilized have peak current values which are substantially the same, it is purely a matter of chance as to which diode achieves the high voltage condition. It is preferred, therefore, that diodes 1 and 2 be very carefully matched. As used herein "matched diodes" refer to diodes having substantially the same value of peak current ($I_p$). For such matched diodes, therefore, the current-voltage characteristic of FIG. 2 may represent either of diodes 1 or 2. The point 14 on the curve of FIG. 2 may represent the operating point of one of the series connected diodes, while the point 15 represents the operating point of the other diode.

The slope of the direct current load line is determined substantially by the resistances 3 and 4 while its intersection, $V_o$, with the voltage axis, is determined by the open circuit voltage applied to the parallel combination of diodes 1 and 2 and resistances 3 and 4. The voltage across the parallel combination and the value of resistances 3 and 4 are selected to establish a load line which intersects the current-voltage characteristic of the series connected diodes at only one point as shown in FIG. 3. To assure that no oscillations are developed during operation, the load line should have a slope less than the slope of the characteristic curve in the region of strong negative resistance of either diodes 1 or 2, but not so much less that it intersects the series connected diode characteristic of FIG. 3 at more than one point.

From the foregoing description of the circuit of FIG. 1, it is apparent that one, and only one, tunnel diode may operate in the high voltage state at any one time. Using very carefully matched diodes it is purely a matter of chance as to which diode achieves the high voltage condition when the voltage source is energized.

A first conductor is connected to the common junction 10 between the diodes 1 and 2 and a second conductor is connected to the common junction 9 between the resistances 3 and 4. The polarity of the output voltage at terminals 11—12 depends upon which of the diodes is in the high voltage condition for the reasons set forth fully above. Although in FIG. 1 the resistance branch of the parallel circuit is shown preferably as a pair of resistances 3 and 4 of equal value, it is apparent that a single tapped resistance may be utilized if desired. In case the current-voltage characteristic of the two diodes are not exactly matched, the resistances 3 and 4 may be of unequal value. In any case, the connection of the second conductor at point 9 in the resistance branch should be established at a point therein to assure that the polarity of the output voltage at terminals 11—12 depends upon which of the diodes is in the high voltage condition but the magnitude of this voltage is independent of the voltage condition of diodes 1 and 2. In appropriate cases, therefore, it may also be advisable to utilize an additional by-pass admittance to more precisely match the characteristics of the two diodes and assure more complete symmetry between the upper and lower portions of the circuit, thus making the logical element more sensitive and reliable in its operation.

To be utilized as a logical element, the polarity of the voltage at the terminals 9—10, which is the binary quantity, must be set in response to an appropriate input signal. Since the system utilizes majority logic there must be an odd number of input signals to the logical element. For the sake of simplicity of description, the operation is described herein in detail for a single input signal.

Assume initially that the voltage source is de-energized so that the circuit is symmetrical. An input signal current is applied at terminals 11—12 of such polarity that a small current flows in the direction from the point 10 to the point 11. This current divides equally between the upper and lower portions of the circuit. Furthermore, at the moment when the power supply is energized the part of the signal current which flows in diode 1 is in a direction in opposition to the current due to the power supply and the part of the signal current which flows in diode 2 is in a direction adding to the current due to the power supply. When the power supply is energized, therefore, the net current in diode 2 is initially greater than that in diode 1 for the polarity of the signal shown.

It is now no longer a matter of chance which diode switches to the high voltage condition. Since diode 2 has a greater current flowing in it, diode 2 will be the first to exceed its peak current and switch to its high voltage condition as the power supply is turned on. The input signal current is effectively amplified and appears as the output at terminals 11—12 and as a voltage whose polarity is the same as the input signal. Similarly an input signal of the opposite polarity assures that diode 1 has the greater net current initially and thus switches to the high voltage condition resulting in an output of this same opposite polarity.

If an odd number of inputs of both polarities are present, the net current flowing will be in the direction corresponding to the polarity of the majority. The polarity of the output voltage at terminals 11—12, therefore, may be set by the polarity of the majority of the input signals applied since the direction of the net initial current is in the direction of the majority of these input signals.

A network is made by converting the voltage at the terminals 11—12 of the basic circuit of FIG. 1 to the signal current required to set the next stage. This is conveniently provided by a coupling resistance between the two stages.

In FIG. 4 there is shown a block diagram of majority logical element 16 and three sources of input signals 17, 18 and 19 connected thereto. The logical element 16 may comprise the logical element of the present invention as illustrated in FIG. 1 or 8. The signals from the sources 17, 18 and 19 are applied to the terminals 11—12 of the element 16. The polarity of the majority of the input signals from the sources 17, 18 and 19 determines the polarity of the output voltage which appears at the same terminals 11—12. This voltage is then converted to a signal current for application to the next stage by means of an appropriate coupling resistance.

Each of the signal sources 17, 18 and 19 may themselves be majority logical elements such as shown in FIG. 4, the output of each source having its polarity previously determined by the polarity of the majority of the inputs thereto. One of the signal sources 17, 18 or 19, however, may supply a signal of constant polarity and thus by means of "logical biasing" a particular one of the elementary logic functions may be realized. It is again pointed out that, while three signal sources 17, 18 and 19 are shown for simplicity, any odd number of input signals may be employed. For example, two of five inputs are made constants in a five-input majority operation while three out of seven inputs are made constants in a seven-input majority operation to realize the desired elementary logic function, AND or OR.

Since the system uses two conductors to feed the information through the different logical elements, there are no ground return paths for the signals. Further, due to the lower inductance of the two conductors as compared with a single conductor, the system is capable of much higher speeds of operation. The inhibit or NOT function may now be easily performed by the simple expedient of interchanging the two output conductors which effectively changes the polarity of the output signal.

As described hereinbefore, the polarity of the voltage of point 9 with respect to point 10 is a binary quantity which may denote a logical function. Block diagrams showing the logical element of this invention utilizing majority inputs to provide the elementary logical functions AND, OR and NOT are shown in FIGS. 5 to 7 respectively. For simplicity of description the block diagrams are shown as a three-input majority operation, however, it is to be understood that in principal any odd number of inputs may be utilized.

Designating a positive polarity as a "1" and a negative polarity as a "0," the logical element in combination with a system of majority logic can be made to perform all the functions required for the most complex system.

FIG. 5 illustrates a block diagram to provide the AND function and the appropriate tables therefore. A constant negative input signal which represents a "0" in the above designation is applied to the logical element. Examination of the Boolean truth table with respect to the table showing possible polarity of inputs *a* and *b* clearly show the realization of the AND function.

The OR function is provided in similar manner as shown in FIG. 6 with a constant positive input signal applied to the logical element. Again reference to the truth table for the OR function illustrates its operation.

The NOT function is made by reversing the polarity of the signal. This may be done most simply by interchanging the output leads as shown in FIG. 7.

All of the logical functions can thus be provided by means of this new and improved logical element in combination with the majority logic. A complete system may be constructed by suitable interconnection of similar logical elements. In addition, since there is amplification at each stage there is adequate allowance for the required logical branching to provide maximum flexibility.

As described hereinbefore, the control of the flow of information in the logical system may be provided by means of a three-phase power supply in known manner. Alternatively, control may be accomplished by the use of backward diodes between the different interconnected circuits or by means of unilateral active circuit elements, such as vacuum tubes and transistors, to couple the different circuits. All such means, however, contribute to the size and complexity of the system. In addition, the use of backward diodes or unilateral circuit elements imposes a limitation on the speed of operation of the system. In large scale systems, therefore, it is most satisfactory to use the three-phase power supply for control of the flow of information therein. In small scale systems, however, it would be most desirable to initiate the entire system from a single voltage pulse. None of the above-described control means are entirely satisfactory when considering high speed, small scale systems.

In accordance with a further embodiment of this invention, therefore, I have provided a logical element capable of extremely high speed operation and having a timing means integral therewith to assure reliable sequential operation between the different interconnected logical elements in a system which is initiated from a single voltage pulse.

In FIG. 8 there is shown the basic logical element of FIG. 1 having a capacitance 20 connected in parallel circuit relationship with diodes 1 and 2 and resistances 3 and 4 thereof. Resistances 21 and 22 are the coupling resistances between different interconnected circuits for converting the voltage between the points 9 and 10 into the required signal current to control the succeeding circuit.

In the operation of the circuit of FIG. 8 capacitance 20 produces a predetermined time delay between the time an initiating voltage pulse appears across the resistances 5 and 6 and the time diodes 1 and 2 achieve their respective operating states. This delay is due to the time required to charge capacitance 20 to the voltage corresponding to the peak point of the narrow junction diodes current-voltage characteristic. Since this charging time, and hence the time delay may be very accurately controlled, each logical element of the system has a timing means integral therewith so that the desired sequence of operation may be achieved with the entire system initiated from a single voltage pulse.

For a germanium narrow junction degenerate semiconductor diode having a peak current of approximately one milliampere the time delay is approximately 100C microseconds where C, the value of capacitance 20, is given in microfarads. By an appropriate variation of the value of capacitance 20, therefore, the delay is very accurately controlled and reliable sequential operation results.

One logical element constructed in accordance with this invention, as illustrated in FIG. 8, utilized the following circuit parameters, which are given by way of example only:

| | |
|---|---|
| Diodes **1** and **2** | Matched General Electric ZJ56 Germanium "tunnel diodes" having peak currents of 1 milliampere. |
| $R_3$ | 180 ohms. |
| $R_4$ | 180 ohms. |
| $R_5$ | 10,000 ohms. |
| $R_6$ | 10,000 ohms. |
| $R_{14}$ | 500 ohms. |
| $R_{15}$ | 500 ohms. |
| V | 15 volts. |
| $C_{20}$ | 0.1 microfarad. |

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. A logical element for performing majority logic comprising: a pair of series connected tunnel diode devices each having a low and a high voltage operating condition; a resistance; means connecting said resistance and said series connected tunnel diode devices in parallel circuit relationship; means for connecting said parallel circuit to a source of voltage adapted to cause operation for one of said diodes in its low voltage condition and the other diode in its high voltage condition; a pair of terminals including a first connection to the junction between said tunnel diode devices and a second connection to a point on said resistance, said point being selected with respect to the characteristics of said tunnel diode devices to provide that the polarity of the output voltage between said pair of terminals is determined by which of said tunnel diode devices is in the high voltage condition; and means for applying an odd number of input signals to said pair of terminals, the polarity of the majority of said input signals determining the polarity of the output of said logical element at said same pair of terminals.

2. A logical element for performing majority logic comprising: a pair of series connected resistances; a pair of series connected tunnel diode devices each having a low and a high voltage operating condition, means connecting said resistances and said series connected tunnel diode devices in parallel circuit relationship; means for connecting said parallel circuit to a source of voltage adapted to cause operation for one of said tunnel diode devices in its low voltage condition and the other tunnel diode device in its high voltage condition; a pair of terminals including a first connection to the junction between said tunnel diode devices and a second connection to the junction between said resistances, said resistances being selected with respect to the respective characteristics of said tunnel diode devices to provide that the polarity of the output voltage between said pair of terminals is determined by which of said tunnel diode devices is in the high voltage condition; and means applying an odd number of input signals to said pair of terminals, the polarity of the majority of said signals determining the polarity of the output of said logical element at said same pair of terminals.

3. A logical element for performing majority logic comprising: a pair of series connected tunnel diode devices each having a low and a high voltage operating condition; a resistance; means connecting said series connected tunnel diode devices and said resistance in parallel circuit relationship; means for connecting said parallel circuit to a source of sequentially energized voltage providing when energized operation for one of said tunnel diode devices in its high voltage condition and the other tunnel diode devices in its low voltage condition; a pair of terminals including a first conductor connected to the junction between said tunnel diode devices and a second conductor connected to a point on said resistance, said point being selected with respect to the characteristics of said tunnel diode devices to provide that the voltage between said conductors has a polarity which is determined by the respective voltage conditions of said tunnel diode devices and a magnitude which is independent thereof; and means for applying an odd number of input signals to said pair of terminals, the polarity of the majority of said signals determining the polarity of the output of said logical element available at said same pair of terminals.

4. In a logical machine including a plurality of interconnected similar logical elements each capable of performing majority logic in a system having a sequentially energized power supply, a logical element for such a machine comprising: a pair of series connected tunnel diode devices each having a high and a low voltage operating condition; a resistance; means connecting said series connected tunnel diode devices and said resistance in parallel circuit relationship; means for connecting said parallel circuit to said sequentially energized power supply to provide when energized operation for one of said tunnel diode devices in its high voltage condition and the other tunnel diode device in its low voltage condition; a pair of terminals including a first connection to the junction between said tunnel diode devices and a second connection to a point on said resistance, said point being selected with respect to the characteristics of said tunnel diode devices to provide that the voltage between said terminals has a polarity which depends upon the respective voltage conditions of said tunnel diode devices and a magnitude independent thereof; means applying an odd number of input signals to said pair of terminals, the polarity of the majority of said signals determining the polarity of the output voltage of said logical element appearing at said same pair of terminals; and resistance means coupling the output of said logical element to the input of a selected energized similar logical element.

5. In a logical machine including a plurality of interconnected similar logical elements each capable of performing majority logic in a system having a sequentially energized power supply, a logical element for such a machine comprising: a pair of series connected tunnel diode devices each having a high and a low voltage operating condition; a pair of series connected resistances; means connecting said series connected tunnnel diode devices and said series connected resistances in parallel circuit relationship; means for connecting said parallel circuit to said sequentially energized power supply to provide when energized operation for one of said tunnel diode devices in its high voltage condition and the other tunnel diode devices in its low voltage condition; a pair of terminals including a first connection to the junction between said tunnel diode devices and a second connection to the junction between said resistances, said resistances being selected with respect to the characteristics of said tunnel diode devices to provide that the voltage between said pair of terminals has a polarity which depends upon the respective voltage conditions of said tunnel diode devices and a magnitude independent thereof; means applying an odd number of input signals to said pair of terminals, the polarity of the majority of said signals determining the polarity of the output voltage of said logical element appearing at said same pair of terminals; and resistance means coupling the output of said logical element to the input of a selected energized similar logical element.

6. In a logical machine including a plurality of interconnected similar logical elements each capable of performing majority logic in a system initiated from a single voltage pulse, a logical element for such a machine comprising: a pair of series connected tunnel diode devices each capable of operation in a low and a high voltage condition; a resistance; a capacitance; means connecting said series connected tunnel diode devices, said resistance and said capacitance in parallel circuit relationship; means for connecting said parallel circuit to a voltage source energized by said initiating pulse and providing when energized operation for one of said tunnel diode devices in its high voltage condition and the other tunnel diode device in its low voltage condition, said capacitance adapted to cause a predetermined delay from the time said voltage source is energized until said tunnel diode devices achieve their respective voltage conditions; a pair of terminals including a first connection to the junction between said tunnel diode devices and a second connection to a point on said resistance, said point being selected with respect to the characteristics of said tunnel diode devices to provide that the voltage between said pair of terminals has a polarity which depends upon the respective voltage conditions of said tunnel diode devices and a magnitude independent thereof; means applying an odd number of input signals to said pair of terminals, the polarity of the majority of said signals determining the polarity of the output voltage of said logical element appearing at said same pair of terminals; and resistance means coupling the output of said logical element to the input of a selected similar logical element.

7. In a logical machine including a plurality of interconnected similar logical elements each capable of performing majority logic in a system initiated from a single voltage pulse, a logical element for such a machine comprising: a pair of series connected tunnel diode devices each capable of operation in a low and a high voltage condition; a pair of series connected resistances; a capacitance; means connecting said series connected tunnel diode devices, said series connected resistances and said capacitance in parallel circuit relationship; means for connecting said parallel circuit to a voltage source energized by said initiating pulse and providing when energized operation for one of said tunnel diode devices in its high voltage condition and the other tunnel diode devices in its low voltage condition, said capacitance adapted to cause a predetermined delay from the time said voltage source is energized until said tunnel diode devices achieve their respective voltage conditions; a pair of terminals including a first connection to the junction between said tunnel diode devices and a second connection to the junction between said resistances, said resistances being selected with the characteristics of said tunnel diode devices to provide that the voltage between said pair of terminals has a polarity which depends upon the respective voltage conditions of said tunnel diode devices and a magnitude independent thereof; means applying an odd number of input signals to said pair of terminals, the polarity of the majority of said signals determining the polarity of the output voltage of said logical element appearing at said same pair of terminals; and resistance means coupling the output of said logical element to the input of a selected similar logical element.

8. A logical element for performing majority logic in a system initiated from a single voltage pulse comprising: a resistance; a pair of series connected tunnel diode devices each capable of operation in a low and a high voltage condition; a capacitance; means connecting said resistance, said series connected tunnel diode devices and said capacitance in parallel circuit relationship; means for connecting said parallel circuit to a voltage source energized by said initiating pulse adapted to cause operation for one of said tunnel diode devices in its high voltage condition and the other tunnel diode device in its low voltage condition, said capacitance adapted to cause a predetermined delay from the time said voltage source is energized until said tunnel diode devices achieve their respective voltage conditions; a pair of terminals including a first connection to the junction between said tunnel diode devices and a second connection to a point on said resistance, said point being selected with respect to the characteristics of said tunnel diode devices to provide that the polarity of the output voltage between said pair of terminals is determined by which of said tunnnel diode devices is in the high voltage condition; and means applying an odd number of input signals to said pair of terminals, the polarity of the majority of said signals determining the polarity of the output of said logical element at said same pair of terminals.

9. A logical element for performing majority logic in a system initiated from a single voltage pulse comprising: a pair of series connected resistances; a pair of series connected tunnel diode devices each capable of operation in a low and a high voltage condition; a capacitance; means connecting said series connected resistances, said series connected tunnel diode devices and said capacitance in parallel circuit relationship; means for connecting said parallel circuit to a voltage source energized by said initiating pulse adapted to cause operation for one of said tunnel diode devices in its high voltage condition and the other tunnel diode device in its low voltage condition, said capacitance adapted to cause a predetermined delay from the time said voltage source is energized until said tunnel diode devices achieve their respective voltage conditions; a pair of terminals including a first connection to the junction between said tunnel diode devices and a second connection to the junction between said resistances, said resistances being selected with respect to the characteristics of said tunnel diode devices to provide that the polarity of the output voltage between said pair of terminals is determined by which of said tunnel diode devices is in the high voltage condition; and means applying an odd number of input signals to said pair of terminals, the polarity of the majority of said signals determining the polarity of the output of said logical element at said same pair of terminals.

10. A logical element for performing majority logic comprising: a pair of tunnel diode devices each having a high and a low voltage operating condition; a pair of resistances; means connecting said tunnel diode devices and said resistances in a bridge network wherein said resistances and said tunnel diode devices form respective arms thereof, said bridge network having a first pair of junctions between said resistances and said tunnel diode devices and a second pair of junctions between said pairs of tunnel diode devices and resistances; means for connecting said first pair of junctions to a voltage source adapted to cause operation for one of said tunnel diode devices in its high voltage condition and the other tunnel diode devices in its low voltage condition; said resistances having values with respect to said tunnel diode devices to provide that the voltage between said second pair of junctions has a polarity which depends upon the respective voltage conditions of said tunnel diode devices and a magnitude independent of such voltage conditions; means for impressing an odd number of input signals between said second pair of junctions; and means for taking an output between said same second pair of junctions, said output having a polarity determined by the polarity of the majority of said input signals.

References Cited in the file of this patent

UNITED STATES PATENTS 2,927,223 Meirowitz ------------- Mar. 1, 1960